US012614828B2

(12) United States Patent
Song et al.

(10) Patent No.: US 12,614,828 B2
(45) Date of Patent: Apr. 28, 2026

(54) RESONATOR AND FILTER

(71) Applicant: Suzhou Luxshare Technology Co., Ltd., Suzhou City (CN)

(72) Inventors: Zhenguo Song, Suzhou City (CN); Shance Lyu, Suzhou City (CN); Shaodong Li, Suzhou City (CN)

(73) Assignee: SUZHOU LUXSHARE TECHNOLOGY CO., LTD., Suzhou City (CN)

( * ) Notice: Subject to any disclaimer, the term of this patent is extended or adjusted under 35 U.S.C. 154(b) by 187 days.

(21) Appl. No.: 18/770,019

(22) Filed: Jul. 11, 2024

(65) Prior Publication Data

US 2025/0046975 A1 Feb. 6, 2025

(30) Foreign Application Priority Data

Aug. 4, 2023 (CN) ......................... 202322095860.5

(51) Int. Cl.

*H01P 1/208* (2006.01)
*H01P 7/06* (2006.01)
*H01P 7/10* (2006.01)

(52) U.S. Cl.

CPC .............. *H01P 1/2084* (2013.01); *H01P 7/06* (2013.01); *H01P 7/10* (2013.01)

(58) Field of Classification Search

CPC .......... H01P 7/06; H01P 1/2086; H01P 1/207; H01P 1/2084; H01P 7/105; H01P 7/10; H01P 1/2002; H01P 1/2138; H01P 7/04; H01P 1/208; H01P 1/04; H01P 1/203; H01P 1/16; H01P 1/2005; H01P 1/20309; H01P 1/2053; H01P 1/211; H01P 1/218;

(Continued)

(56) References Cited

U.S. PATENT DOCUMENTS 6,750,739 B2 * 6/2004 Enokihara ............. H01P 1/2084 333/219.1
11,239,540 B2 * 2/2022 Meng ........................ H01P 7/06

(Continued)

FOREIGN PATENT DOCUMENTS

CN 218633883 U 3/2023
CN 110868177 B 8/2023
CN 219717235 U 9/2023

*Primary Examiner* — John W Poos

(74) *Attorney, Agent, or Firm* — Birch, Stewart, Kolasch & Birch, LLP

(57) ABSTRACT

The embodiment discloses a resonator and a filter, the resonator comprises a housing, a cover plate, a metal resonant rod, a buffer, and a dielectric member. A resonant cavity with one side opening is formed inside the housing. The cover plate covers the outside of the opening. The metal resonant rod, buffer, and dielectric member are fixed in the resonant cavity, and sequentially welded. The linear expansion coefficient of the buffer is between the linear expansion coefficients of the metal resonant rod and the dielectric member, so that the deformation generated by the buffer during welding is between the deformations generated by the metal resonant rod and the dielectric member, providing a buffering effect when the metal resonant rod and the dielectric member deform, avoiding cracking at the connection between the metal resonant rod and the dielectric member due to significant differences in deformation during welding.

8 Claims, 3 Drawing Sheets

(58) Field of Classification Search
CPC .......... H01P 1/219; H01P 11/007; H01P 3/12; H01P 7/00
See application file for complete search history.

(56) References Cited

U.S. PATENT DOCUMENTS

| | | | | |
|---|---|---|---|---|
| 11,688,920 | B2 * | 6/2023 | Meng | H01P 7/105<br>333/219.1 |
| 2024/0128623 | A1 * | 4/2024 | Gao | H01P 1/207 |

* cited by examiner

RESONATOR AND FILTER

CLAIM OF PRIORITY AND CROSS-REFERENCE TO RELATED APPLICATION(S)

This application claims the benefit of Chinese Patent Application No. 202322095860.5, filed on Aug. 4, 2023, which is incorporated herein by reference in its entirety.

BACKGROUND OF THE DISCLOSURE

1. Field of the Disclosure

The present disclosure relates to the field of electronic device technology, and particularly to a resonator and a filter.

2. Description of the Related Art

In wireless communication, filters are widely used as a frequency selection device, and resonators are the main components that make up filters. In a resonator, the resonant frequency may be adjusted by changing the shape, size, and material of a resonant rod. The common materials for resonant rods are metal and dielectric materials, among which the application of resonant rods combined with metal and dielectric is becoming increasingly widespread. The connection method between the metal resonant rod and the dielectric is mostly welding, but the large difference in the linear expansion coefficient between the metal resonant rod and the dielectric leads to a significant difference in the deformation generated during welding, resulting in the rupture of the metal resonant rod and the dielectric.

BRIEF DESCRIPTION OF THE DISCLOSURE

In view of this, the present disclosure provides a resonator and a filter that may effectively reduce the risk of metal resonance rod and dielectric rupture during welding between the metal resonance rod and the dielectric.

In the first aspect, the embodiment of the present disclosure provides a resonator, comprising: a housing comprising a resonant cavity having an opening; a cover plate covering the outside of the opening of the resonant cavity and connected to the housing; a metal resonant rod disposed in the resonant cavity, and the metal resonant rod is fixedly connected to the bottom of the housing; a buffer disposed in the resonant cavity, and the buffer is fixedly connected to the top end of the metal resonant rod; and a dielectric member disposed in the resonant cavity, and the dielectric member is fixedly connected to the top end of the buffer member; wherein a linear expansion coefficient of the buffer is between a linear expansion coefficient of the metal resonance rod and a linear expansion coefficient of the dielectric member.

Furthermore, the linear expansion coefficient of the metal resonating rod is $16\times10^{-6}/^{\circ}$ C. to $18\times10^{-6}/^{\circ}$ C., the linear expansion coefficient of the buffer is $10\times10^{-6}/^{\circ}$ C. to $14\times10^{-6}/^{\circ}$ C., and the linear expansion coefficient of the dielectric member is $8\times10^{-6}/^{\circ}$ C. to $10\times10^{-6}/^{\circ}$ C.

Furthermore, a first cavity is provided inside the metal resonating rod, the middle part of the buffer is a hollow structure, a second cavity is provided inside the dielectric member, and the first cavity, the hollow structure, and the second cavity are sequentially connected.

Furthermore, the housing further comprises a mounting platform protruding on the bottom surface of the resonant cavity, and the metal resonant rod is fixed on the mounting platform.

Furthermore, the resonator further comprises a tuning screw and a nut connected to the tuning screw, the tuning screw is threaded connected to the cover plate and extends through the cover plate into the resonator cavity, and the nut is located on the outside of the cover plate.

Furthermore, the resonator further comprises a connecting bolt, and the metal resonating rod is connected to the mounting platform through the connecting bolt.

Furthermore, the buffer is welded to the top of the metal resonating rod, and the dielectric member is welded to the top of the buffer.

In the second aspect, the embodiment of the present disclosure provides a filter, comprising a resonator as described in the first aspect.

The embodiment discloses a resonator and a filter, the resonator comprises a housing, a cover plate, a metal resonant rod, a buffer, and a dielectric member. A resonant cavity with one side opening is formed inside the housing, and the cover plate covers the outer side of the resonant cavity opening. The metal resonant rod, buffer, and dielectric member are fixed in the resonant cavity, and the metal resonant rod, buffer, and dielectric member are sequentially welded. The linear expansion coefficient of the buffer is between the linear expansion coefficient of the metal resonant rod and the linear expansion coefficient of the dielectric member, so that the deformation generated by the buffer during welding is between the deformation generated by the metal resonant rod and the dielectric member, providing a buffering effect when the metal resonant rod and the dielectric member deform, avoiding cracking at the connection between the metal resonant rod and the dielectric member due to significant differences in deformation during welding.

BRIEF DESCRIPTION OF THE DRAWINGS

The above and other objectives, features, and advantages of the disclosure will become clearer through the description of the embodiment of the disclosure with reference to the accompanying drawings, in which.

DETAILED DESCRIPTION OF EMBODIMENTS OF THE DISCLOSURE

The following describes this application based on embodiments, but this application is not limited to these embodiments. In the following detailed description of this application, some specific details are elaborately described. For those skilled in the art, the absence of detailed descriptions of these details does not prevent them from fully understanding this application. To avoid confusing the essence of this application, well-known methods, processes, flows, components, and circuits are not detailed.

In addition, those skilled in the art should understand that the figures provided here are for illustrative purposes only, and the figures may not be drawn to scale.

Unless otherwise clearly specified and defined, the terms “installation”, “connection”, “fixation”, and others should be understood broadly. For example, they may be fixed connections, or they may be detachable connections, or integrated; they may be mechanical connections, or electrical connections; they may be direct connections, or indirect connections through an intermediate medium, they may be internal connections between two components or the interaction between two components, unless otherwise clearly defined. For those skilled in the art, the specific meaning of the above terms in this application may be understood based on the specific situation.

Unless explicitly required by the context, the words “include”, “contains”, and similar terms throughout the application document should be interpreted as inclusive rather than exclusive or exhaustive; that is, they have the meaning of “including but not limited to”.

In the description of this application, it is necessary to understand that the terms “first”, “second”, etc. are only used for descriptive purposes and should not be understood as indicating or implying relative importance. Furthermore, in the description of this application, unless otherwise specified, the meaning of “multiple” is two or more.

Figure 1:
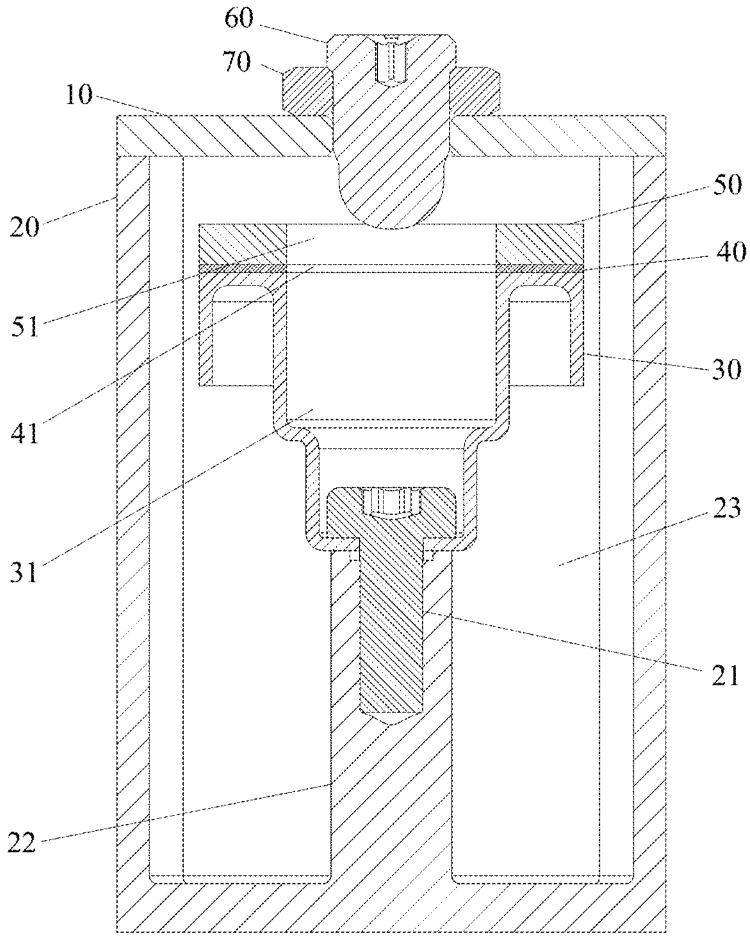
FIG. 1 is a sectional view of a resonator according to an embodiment of the present disclosure.

FIG. 1 is a sectional view of a resonator according to an embodiment of the present disclosure. Referring to FIG. 1, the resonator includes a housing 20, a cover plate 10, a metal resonant rod 30, a buffer 40, and a dielectric member 50. Inside the housing 20, there is a resonant cavity 23 with an opening on one side. The cover plate 10 is connected to the open side of the housing 20. The metal resonant rod 30, the buffer 40, and the dielectric member 50 are arranged inside the resonant cavity 23. The buffer 40 is fixedly connected to the top of the metal resonant rod 30, and the dielectric member 50 is fixedly connected to the top of the buffer 40. In this embodiment, welding is used to fixedly connect the dielectric member 50, the buffer 40, and the metal resonant rod 30, but fusion welding, laser welding, electric welding, or related methods may also be used for fixation.

Wherein, the metal resonant rod 30, the buffer 40, and the dielectric member 50 have sequentially decreasing coefficients of linear expansion. Therefore, when the dielectric member 50 is welded and fixed above the metal resonant rod 30, the deformation amount of the buffer 40 is between the deformation amount of the metal resonant rod 30 and the deformation amount of the dielectric member 50. The buffer 40 between the metal resonant rod 30 and the dielectric member 50 may provide a cushioning effect, preventing the metal resonant rod 30 and the dielectric member 50 from cracking at the connection due to a large difference in deformation when they are directly welded.

Specifically, in the resonator, the metal resonant rod 30, the buffer 40, and the dielectric member 50 are all made of conductive materials to achieve frequency adjustment in the resonator. The linear expansion coefficients of the metal resonant rod 30, the buffer 40, and the dielectric member 50 decrease in this order. The linear expansion coefficient of the metal resonating rod 30 is $16\times10^{-6}/^\circ$ C. to $18\times10^{-6}/^\circ$ C., the linear expansion coefficient of the buffer 40 is $10\times10^{-6}/^\circ$ C. to $14\times10^{-6}/^\circ$ C., and the linear expansion coefficient of the dielectric member 50 is $8\times10^{-6}/^\circ$ C. to $10\times10^{-6}/^\circ$ C. When welding the metal resonant rod 30, the buffer 40, and the dielectric member 50 together, the buffer 40 is first welded to the top of the metal resonant rod 30, followed by welding the dielectric member 50 to the top of the buffer 40. During welding, since the deformation of the buffer 40 is between the deformation of the metal resonant rod 30 and the deformation of the dielectric member 50, the stress experienced at the connection between the metal resonant rod 30 and the buffer 40, and at the connection between the buffer 40 and the dielectric member 50, due to deformation is reduced, greatly reducing the risk of cracking in the metal resonant rod 30 and the dielectric member 50.

Optionally, the metal resonant rod 30 is made of one of the materials such as SUS304 stainless steel, SUS303 stainless steel, or SUS316 stainless steel. The dielectric member 50 is sintered from a ceramic material with a high dielectric constant greater than 30 $C^2/(N\cdot M^2)$. The buffer 40 is selected from materials with a linear expansion coefficient close to that of the dielectric member 50, such as DC04 steel. It is understood that the metal resonant rod 30, buffer 40, and dielectric member 50 may also be made of other suitable materials. The resonator may effectively improve the quality factor of the resonator by loading a high dielectric constant dielectric, thereby improving the insertion loss of the resonator.

Furthermore, as shown in FIG. 1, a first cavity 31 is provided inside the metal resonant rod 30, the middle part of the buffer 40 is a hollow structure 41, and a second cavity 51 is provided inside the dielectric member 50. After welding the metal resonant rod 30, the buffer 40, and the dielectric member 50 together, the first cavity 31, the hollow structure 41, and the second cavity 51 are sequentially connected, effectively improving the tuning performance of the resonator.

Furthermore, as shown in FIG. 1, the resonator also includes a tuning screw 60 and a nut 70. The tuning screw 60 is threadedly connected to the cover plate 10 and extends through the cover plate 10 into the second cavity 51 of the dielectric member 50. The tuning screw 60 is made of a surface-plated metal material. The nut 70 is located on the outside of the cover plate 10 and is connected to the tuning screw 60, increasing the stability of the tuning screw 60 during adjustment. Specifically, the tuning screw 60 may be made of silver-plated or copper-plated parts. Furthermore, the tuning screw 60 is electrically connected to the cover plate 10, and the part of the tuning screw 60 extending into the second cavity 51 forms capacitive coupling with the dielectric member 50. The resonator may change the size of the coupling capacitance by adjusting the depth of the tuning screw 60 in the second cavity 51, thereby adjusting the resonant frequency of the resonator.

Furthermore, a certain gap is left between the dielectric member 50 and the cover plate 10 to form a single-ended open-circuit dielectric metal resonant rod structure. Therefore, the cover plate 10 may be a single-layer cover plate to improve the stability of the product. Optionally, the dielectric member 50 may also abut against the cover plate 10, and the cover plate 10 may be a multi-layer cover plate to increase the stability of the dielectric member 50, buffer 40, and metal resonant rod 30 within the resonant cavity 23.

Furthermore, as shown in FIG. 1, a mounting platform 22 protrudes from the bottom surface of the housing 20, and a metal resonant rod 30 is fixed on the mounting platform 22. The mounting platform 22 is located inside the resonant cavity 23 on the side opposite the cover plate 10, and is fixedly connected to the metal resonant rod 30. The height of the mounting platform 22 is determined by the temperature drift index of the filter.

Figure 2:
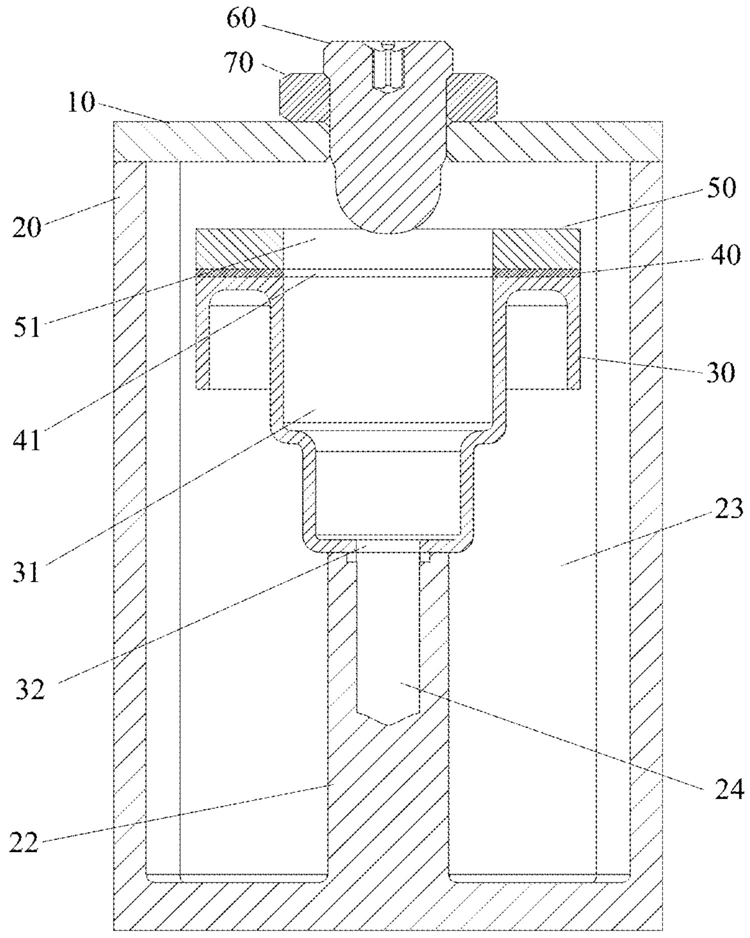
FIG. 2 is a sectional view of a resonator without a connecting bolt in an embodiment of the present disclosure.

Furthermore, as shown in FIG. 1, the resonator also includes a connecting bolt 21, and the metal resonant rod 30 is connected to the mounting platform 22 through the connecting bolt 21. As shown in FIG. 2, the mounting platform 22 is provided with a threaded hole 24, and the bottom of the metal resonant rod 30 is provided with a through hole 32. The connecting bolt 21 passes through the through hole 32 at the bottom of the metal resonant rod 30 and is threaded connected to the threaded holes 24 of the mounting platform 22, allowing the metal resonant rod 30 to be fixedly connected to the housing 20, thereby restricting the movement of the metal resonant rod 30 within the resonant cavity 23 and increasing the axial stability of the resonator.

Figure 3:
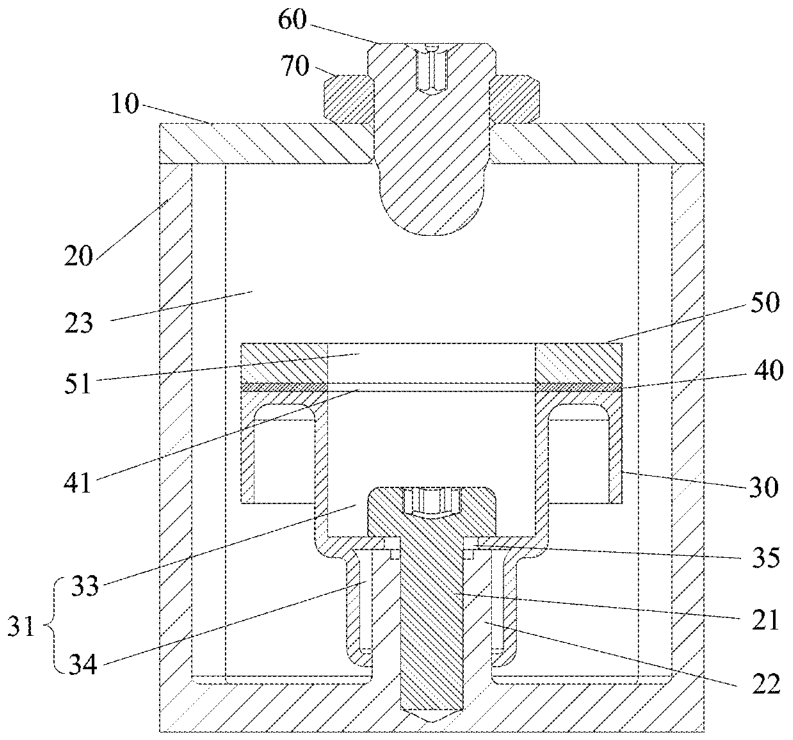
FIG. 3 is a sectional view of a resonator in another embodiment of the present disclosure.

In an optional embodiment, as shown in FIG. 3, the first cavity 31 of the metal resonant rod 30 includes an upper cavity 33 and a lower cavity 34, which are connected through a connecting hole 35. The mounting platform 22 is located inside the lower cavity, and the connecting bolt 21 passes through the connecting hole 35 to secure the metal resonant rod 30 to the mounting platform 22. The metal resonant rod 30 contacts the bottom of the housing 20, effectively enhancing the tuning performance of the resonator.

Furthermore, when the distance between the dielectric member 50 and the cover plate 10 remains constant, the radial size of the mounting platform 22 may affect the resonant frequency of the resonant cavity 23, achieving a better tuning effect.

It is understandable that the method of welding the metal resonant rod 30 and the dielectric member 50 together through the buffer 40 may be applied in other suitable resonators.

Furthermore, the embodiment of the disclosure also provides a filter, which includes the aforementioned resonator.

A resonator in this embodiment utilizes a buffer with a linear expansion coefficient that falls between a metal resonant rod and a dielectric member. Welding the metal resonant rod to the dielectric member through this buffer effectively reduces the risk of cracking during welding. Loading the dielectric onto the top of the metal resonator may significantly lower the resonator's maximum field strength, improving the filter's power specifications. Compared to all-dielectric resonators, the dielectric member, buffer, and metal resonant rod not only ensure the resonator's performance specifications but also effectively reduce costs.

The above-mentioned is only a preferred embodiment of this application and is not intended to limit this application. For those skilled in the art, this application may be subject to various modifications and variations. Any modifications, equivalent replacements, and improvements made within the spirit and principle of this application should be included in the scope of protection of this application.

We claim:

1. A resonator, comprises:

a housing comprising a resonant cavity having an opening;

a cover plate covering the outside of the opening of the resonant cavity and connected to the housing;

a metal resonant rod disposed in the resonant cavity, and the metal resonant rod is fixedly connected to the bottom of the housing;

a buffer disposed in the resonant cavity, and the buffer is fixedly connected to the top end of the metal resonant rod; and a dielectric member disposed in the resonant cavity, and the dielectric member is fixedly connected to the top end of the buffer member;

wherein a linear expansion coefficient of the buffer is between a linear expansion coefficient of the metal resonance rod and a linear expansion coefficient of the dielectric member.

2. The resonator according to claim 1, wherein the linear expansion coefficient of the metal resonating rod is $16\times10^{-6}/°$ C. to $18\times10^{-6}/°$ C., the linear expansion coefficient of the buffer is $10\times10^{-6}/°$ C. to $14\times10^{-6}/°$ C., and the linear expansion coefficient of the dielectric member is $8\times10^{-6}/°$ C. to $10\times10^{-6}/°$ C.

3. The resonator according to claim 1, wherein a first cavity is provided inside the metal resonating rod, the middle part of the buffer is a hollow structure, a second cavity is provided inside the dielectric member, and the first cavity, the hollow structure, and the second cavity are sequentially connected.

4. The resonator according to claim 1, wherein the housing further comprises a mounting platform protruding on the bottom surface of the resonant cavity, and the metal resonant rod is fixed on the mounting platform.

5. The resonator according to claim 1, wherein the resonator further comprises a tuning screw and a nut connected to the tuning screw, the tuning screw is threaded connected to the cover plate and extends through the cover plate into the resonator cavity, and the nut is located on the outside of the cover plate.

6. The resonator according to claim 4, wherein the resonator further comprises a connecting bolt, and the metal resonating rod is connected to the mounting platform through the connecting bolt.

7. The resonator according to claim 1, wherein the buffer is welded to the top of the metal resonating rod, and the dielectric member is welded to the top of the buffer.

8. A filter, comprises a resonator according to claim 1.

* * * * *